(12) United States Patent
Agneeswaran

(10) Patent No.: US 8,713,182 B2
(45) Date of Patent: Apr. 29, 2014

(54) SELECTION OF A SUITABLE NODE TO HOST A VIRTUAL MACHINE IN AN ENVIRONMENT CONTAINING A LARGE NUMBER OF NODES

(75) Inventor: Vijay Srinivas Agneeswaran, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 512 days.

(21) Appl. No.: 12/534,157

(22) Filed: Aug. 3, 2009

(65) Prior Publication Data
US 2011/0029672 A1   Feb. 3, 2011

(51) Int. Cl.
*G06F 15/173* (2006.01)

(52) U.S. Cl.
USPC .............................. 709/226; 710/36; 711/150

(58) Field of Classification Search
USPC ......................................................... 709/226
See application file for complete search history.

(56) References Cited

U.S. PATENT DOCUMENTS

| | | | |
|---|---|---|---|
| 7,039,634 B2 | 5/2006 | Xu et al. | |
| 2002/0010798 A1* | 1/2002 | Ben-Shaul et al. | 709/247 |
| 2002/0184311 A1 | 12/2002 | Traversat et al. | |
| 2005/0021758 A1 | 1/2005 | White | |
| 2005/0033768 A1* | 2/2005 | Sayers et al. | 707/104.1 |
| 2005/0120160 A1* | 6/2005 | Plouffe et al. | 711/1 |
| 2005/0160424 A1 | 7/2005 | Broussard et al. | |
| 2006/0174101 A1 | 8/2006 | Bluhm et al. | |
| 2006/0294238 A1 | 12/2006 | Naik et al. | |
| 2007/0016587 A1 | 1/2007 | Ranger et al. | |
| 2007/0250489 A1 | 10/2007 | Bao et al. | |
| 2008/0195597 A1* | 8/2008 | Rosenfeld et al. | 707/5 |
| 2010/0257181 A1* | 10/2010 | Zhou et al. | 707/747 |

OTHER PUBLICATIONS

"Renato J. Figueiredo et. al.", "A Case for Grid Computing on Virtual Machines", Proceedings of the 23rd International Conference on Distributed Computing (ICDCS 2003), Publication Date: May 19-22, 2003, pp. 1-10.

"Norberto Fernandez-Garcia et. al.", "An Ontology-Based P2P System for Query-Based Semantic Annotation Sharing", Ontologies in P2P Communities Workshop colocated with ESWC 2005, Dated: May 2005, pp. 1-12.

"Tommy Gagnes et. al.", "Peer-To-Peer Technology—an Enabler for Command and Control Information Systems in a Network Based Defence?", Command and Control Research and Technology Symposium (CCRTS), Dated: 2004, pp. 1-10.

(Continued)

*Primary Examiner* — Jude Jean Gilles
*Assistant Examiner* — Jaren M Means
(74) *Attorney, Agent, or Firm* — Narendra Reddy Thappeta

(57) ABSTRACT

An aspect of the present invention facilitates selecting suitable nodes to host virtual machines (VMs) in an environment containing a large number of nodes (such as a grid). In one embodiment, information indicating corresponding resources available in each machine node (a node capable of hosting VMs) in the grid is maintained distributed over a set of management nodes contained in the grid. On receiving an indication that a VM requiring a set of resources is sought to be hosted, a machine node having available the set of resources is identified based on the distributed information. The VM is then provisioned/hosted on the identified machine node. The maintenance of the resource availability information distributed across multiple management nodes enables the solution to be scaled for use in environments having a large number of nodes.

27 Claims, 7 Drawing Sheets

(56) References Cited

OTHER PUBLICATIONS

"Giovanni Conforti et. al.", "Scalable Query Dissemination in XPEER", Proceedings of the 1st Workshop on Emerging Research Opportunities for Web Data Management (EROW 2007) Collocated with the 11th International Conference on Database Theory (ICDT 2007), Dated: Jan. 13, 2007, pp. 1-15.

"Mikael Nilsson", "The Edutella P2P Network", Supporting Democratic E-learning and Communities of Practice, in McGreal, R. (ed.) Online education using learning objects, Falmer Press, ISBN 0-415-33512-4, Dated: 2004, pp. 1-9.

"Van Renesse, R. et. al.", "Astrolabe: A Robust and Scalable Technology for Distributed System Monitoring, Management, and Data Mining", ACM Transactions on Computer Systems (TOCS), vol. 21, Issue 2, Dated: May 2003, pp. 164-206.

"Douglas Thain et. al.", "Condor and the Grid", Book Chapter in Grid Computing: Making the Global Infrastructure a Reality, editors Fran Berman and Geoffrey Fox and Tony Hey, John Wiley & Sons Publishers, Dated: 2002, pp. 299-336.

"David Oppenheimer et. al.", "Design and Implementation Tradeoffs for Wide-Area Resource Discovery", 14th IEEE International Symposium on High Performance Distributed Computing (HPDC-14), Dated: Jul. 24-27, 2005, pp. 113-124.

"Philippe Cudré-Mauroux et. al.", "Gridvine: an Infrastructure for Peer Information Management", IEEE Internet Computing, vol. 11, Issue 5, Dated: Sep.-Oct. 2007, pp. 36-44.

Tao Gu et.al., "A Hierarchical Semantic Overlay for P2P Search", The 25th Conference on Computer Communications Sponsored by IEEE Communications Society, Institute for Infocomm Research and National University of Singapore, Dated: Apr. 26, 2006, pp. 1-3.

"Min Cai and Martin Frank et. al.", "RDFPeers: a Scalable Distributed RDF Repository Based on a Structured Peer-To-Peer Network", ACM Proceedings of the 13th international conference on World Wide Web (WWW '04), Dated: May 2004, pp. 650-657.

"Juan Li and Son Vuong", "Semnatic Overlay Network for Grid Resource Discovery". The 6th IEEE/ACM International Workshop on Grid Computing, Dated Nov. 13-14, 2005, pp. 288-291.

"Arturo Crespo and Hector Garcia-Molina", "Semantic Overlay Networks for P2P Systems", Google Technologies Inc., Stanford University, Dated: 2003, pp. 1-16.

"Jörg Eberspächer et.al.", "Structured P2P Networks in Mobile and Fixed Environments", Second International working conference on Performance Modelling and Evaluation of Heterogeneous Networks, Ilkley, West Yorkshire, U.K., Dated: Jul. 2004, pp. T4/1-T4/25.

"Roman Schmidt", "The P-Grid System—Overview", School of Computer and Communication Sciences. Ecole Polytechnique F'ed'erale de Lausanne (EPFL), CH-1015 Lausanne, Switzerland, Dated: Mar. 8, 2007, pp. 1-11.

\* cited by examiner

SELECTION OF A SUITABLE NODE TO HOST A VIRTUAL MACHINE IN AN ENVIRONMENT CONTAINING A LARGE NUMBER OF NODES

BACKGROUND OF THE INVENTION

1. Technical Field

The present disclosure relates to distributed computing systems and more specifically to selection of a suitable node to host a virtual machine (VM) in an environment containing a large number of nodes.

2. Related Art

There are several environments in which a large number of computer/digital processing systems (commonly referred to as "nodes") are employed. For example, many thousands (or many more) of nodes may be connected by fast networks to operate as a single processing system (referred to as a "grid" or "cluster") in providing services to end users. Such clusters/grids are generally used to perform computationally intensive tasks such as weather simulations, (air/rail) traffic management, etc.

Virtual machines (VMs) often form the basis for executing various user applications (providing services to end users) in such environments. As is well known, a virtual machine is a container in which user applications are executed. A node can host multiple virtual machines, and the virtual machines provide a view of a complete machine (computer system) to the user applications executing in the virtual machine. Thus, when multiple VMs are hosted on a single node, the memory and processing resources (of the node) are shared by the hosted VMs.

It is often required to select a suitable node (having the required memory and processing resources) for hosting a VM in environments employing a large number of nodes.

BRIEF DESCRIPTION OF THE DRAWINGS

Example embodiments of the present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

An aspect of the present invention facilitates selecting suitable nodes to host virtual machines (VMs) in an environment containing a large number of nodes (such as a grid). In one embodiment, information indicating corresponding resources available in each machine node (a node capable of hosting VMs) in the grid is maintained distributed over a set of management nodes contained in the grid. On receiving an indication that a VM requiring a set of resources is sought to be hosted, a machine node having available the set of resources is identified based on the distributed information. The VM is then provisioned/hosted on the identified machine node. The maintenance of the resource availability information distributed across multiple management nodes enables the solution to be scaled for use in environments having a large number of nodes.

According to another aspect of the present invention resource availability data for each machine node is maintained on a management node, which is determined according to a convention which maps each (combination of) value of available resources to a corresponding management node. In an embodiment, a first hash function generates a corresponding one of a set of hashed identifiers for each value of the available resources and a second hash function generates a corresponding one of the same set of hashed identifiers for each management node identifier. A resource availability data having a first value is mapped to (and thus stored on) a first management node, if the same hashed identifier is generated by both of the first and second hash functions based respectively on the first value and a node identifier of the first management node.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1:
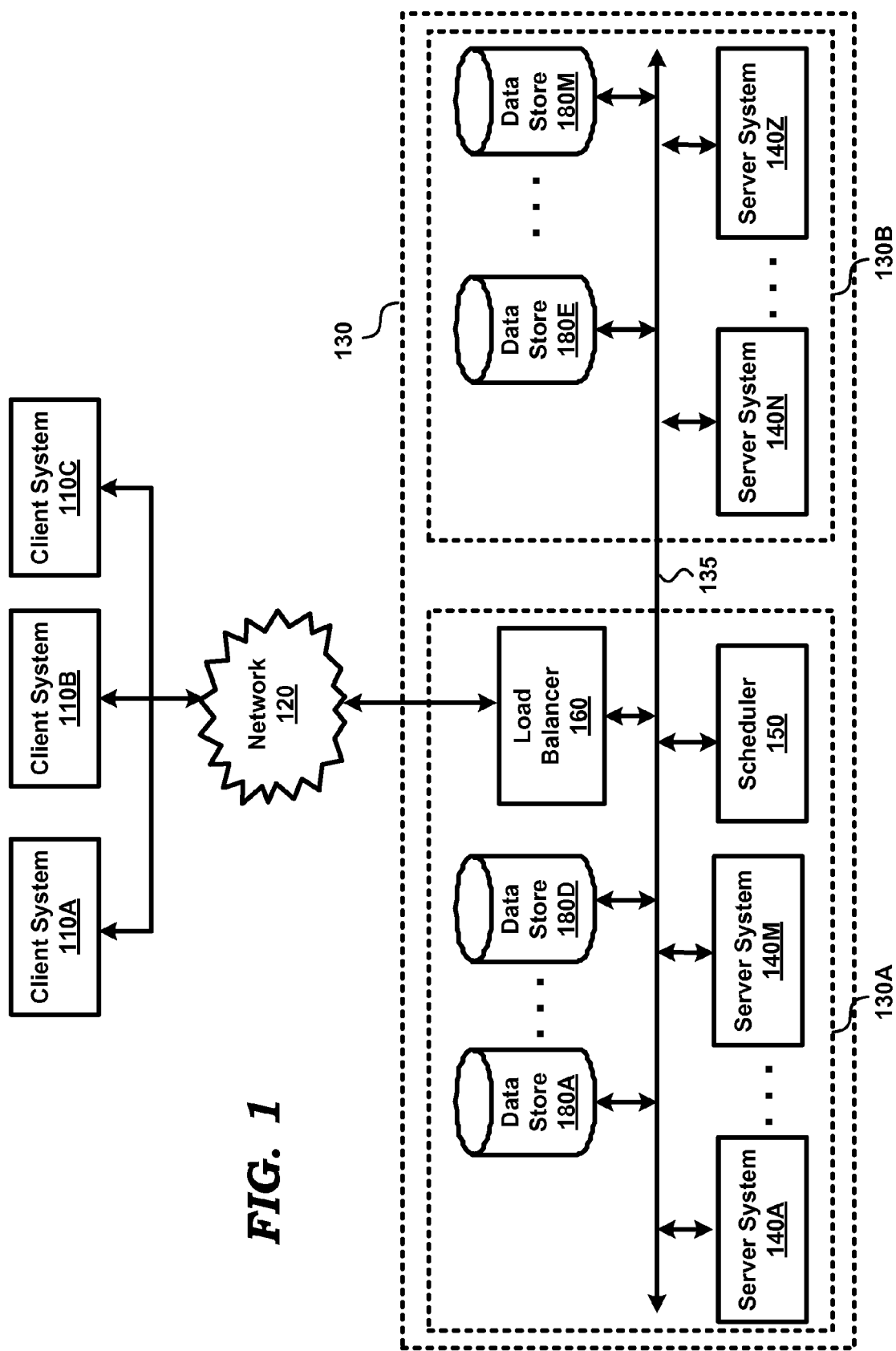
FIG. 1 is a block diagram illustrating an example environment (computing system) in which several aspects of the present invention can be implemented.

FIG. 1 is a block diagram illustrating an example environment (computing system) in which several aspects of the present invention can be implemented. The block diagram is shown containing client systems 110A-110C, network 120, and grid/cluster 130. Grid 130 is shown containing data centers 130A and 130B. Data center 130A is shown containing server systems 140A-140M, scheduler 150, load balancer 160, and data stores 180A-180D, while data center 130B is shown containing server systems 140N-140Z and data stores 180E-180M.

Merely for illustration, only representative number/type of data centers and systems within the data centers is shown in FIG. 1. Many environments often contain many more data centers, in turn containing many more systems, both in number and type, and located geographically separately (but connected with each other via corresponding communication paths), depending on the purpose for which the environment is designed. Each system/device of FIG. 1 is described below in further detail.

Network 120 provides connectivity between client systems 110A-110C and grid 130. Network 120 may be implemented using protocols such as Transmission Control Protocol (TCP) and/or Internet Protocol (IP), well known in the relevant arts. In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered.

Each of client systems 110A-110C represents a system such as a personal computer, workstation, mobile station, etc., used by users to generate (client) requests to enterprise applications/softwares (user applications, in general) executed in virtual machines (VMs) in server systems/nodes in grid 130. The requests (for using specific services provided by the VMs) may be generated using appropriate user interfaces. In general, a client system requests a user application in a VM for performing desired tasks/services and receives corresponding responses containing the results of performance/processing of the requested tasks/services.

Grid/cluster 130 represents a group of systems (i.e., "nodes") such as server systems, data stores, schedulers, etc., that can work together to operate as a single processing system in providing services. Grids/clusters may include heterogeneous (i.e., having different hardware/software configuration) collections of nodes, that may be distributed geographically across multiple locations, and may sometimes be administered by unrelated organizations.

Accordingly, data centers 130A and 130B may be physically located in different geographical locations, for example, in different cities/countries. Systems in data centers 130A and 130B may operate in conjunction as a single server/system in providing services. In other words, users using client systems 110A-110C view data centers 130A and 130B as a single system (grid 130) offering specific desired services (without being concerned about the specific individual nodes in the grid/cluster).

Communication path 135 contains both local area networks (LAN) to provide connectivity among digital systems within a data center, as well as (high speed) paths between data centers. Thus, components/nodes in each of data centers 130A and 130B may communicate with each internally within the data centers as well as with components/nodes in the other data center. Due to such connectivity, a grid/cluster may span multiple data centers, while providing a desired high throughput performance.

Some of the typical nodes in grid 130, such as data stores, server systems, load balancer, and scheduler as relevant to the understanding of the present invention are described in detail below. However, grid 130 may contain more types and/or number (typically, in thousands) of nodes across multiple data centers, as will be apparent to one skilled in the relevant arts by reading the disclosure provided herein.

Load balancer 160 forwards client requests (received via network 120) to a corresponding VM (a node) in grid 130, and may maintain information internally indicating which of the VMs in server systems 140A-140M and 140N-140Z is currently available/ready for processing user requests (directed to a specific user application). The selection of the specific node to service a client request is generally designed to minimize the response time to the request (though other criteria, as suited for the corresponding environments can be used), and may be performed using any of several well-known techniques.

In one embodiment, load balancer 160 receives TCP/IP packets (corresponding to the user requests) that have destination address equal to the IP address of the load balancer, and forwards each request in a packet having the IP address of the respective node (executing the specific application instances in a corresponding VM) as the destination IP address.

Each of data stores 180A-180M represents a non-volatile storage facilitating storage and retrieval of a collection of data by one or more enterprise applications/softwares executing in grid 130, in particular in server systems 140A-140Z (typically while processing various client/user requests). Some of the data stores may be implemented using relational database technologies and therefore provide storage and retrieval of data using structured queries such as SQL (Structured Query Language). Other data stores may be implemented as file stores providing storage and retrieval of data in the form of one or more files organized as one or more directories, as is well known in the relevant arts.

Each of server systems 140A-140Z hosts multiple virtual machines (VM) of the same/different type (e.g., some VMs may be of Java Virtual Machine (JVM) software product available from Sun Microsystems, while some others may be of VMWare Workstation software product available from VMware Corporation), which in turn execute user applications, designed to process client requests. Each user application is implemented with the program logic to process the corresponding client request. It should be appreciated that the same user application type (e.g., a payroll management application) is often executed as multiple instances (typically on different servers, but multiple instances can be executed in the same server on same/different VMs) for reasons such as scalability, partitioning by different customer entities, etc.

Scheduler (also termed grid resource manager) 150 schedules provisioning/termination of VMs as well as application instances on corresponding nodes, typically consistent with the load and service level expectations set with the customers. Once a user application is available (or terminated) on a corresponding VM, the corresponding node/VM/user application information may be communicated to load balancer 160 thereafter.

Although only a single scheduler (150) is shown in FIG. 1, multiple (cooperative) instances of scheduler 150 may be executed, for example one each in each of data centers 130A and 130B. In such a scenario, each of the instances may communicate with each other via path 135 to perform the operations noted above in a coordinated fashion.

As noted above, it is often required to select a suitable node (having the required memory and processing resources) in grid 130 for hosting a VM. For example, such a requirement may arise when a new VM is sought to be added (to facilitate execution of more number of application instances to handle more number of user requests) or when an existing VM is sought to be moved/migrated from the host node to another node in the grid (to facilitate shutting down of nodes, when the number of user request is considerably reduced).

In one prior approach, the information related to the VMs hosted in each node in grid 130 in maintained centrally by a central server such as scheduler 150. Accordingly, scheduler 150 may maintain information (in one of data stores 180A-180M) specifying the VMs currently hosted in each of server systems 140A-140Z, the resources (in terms of percentage of CPU/processor time usage and memory requirements) consumed by each VM, and the amount of unused/free resources currently available in each server system/node. A suitable node may then be identified by inspecting the maintained information. Such an approach is generally not practicable/scalable in a scenario when grid 130 contains a large number of nodes (typically in 1000s).

Several aspects of the present invention enable selection of a suitable node to host a VM particularly in environments (such as grid 130) containing a large number of nodes, in particular, when spanning multiple geographic locations (data centers).

3. Selection of a Suitable Node to Host a VM

Figure 2:
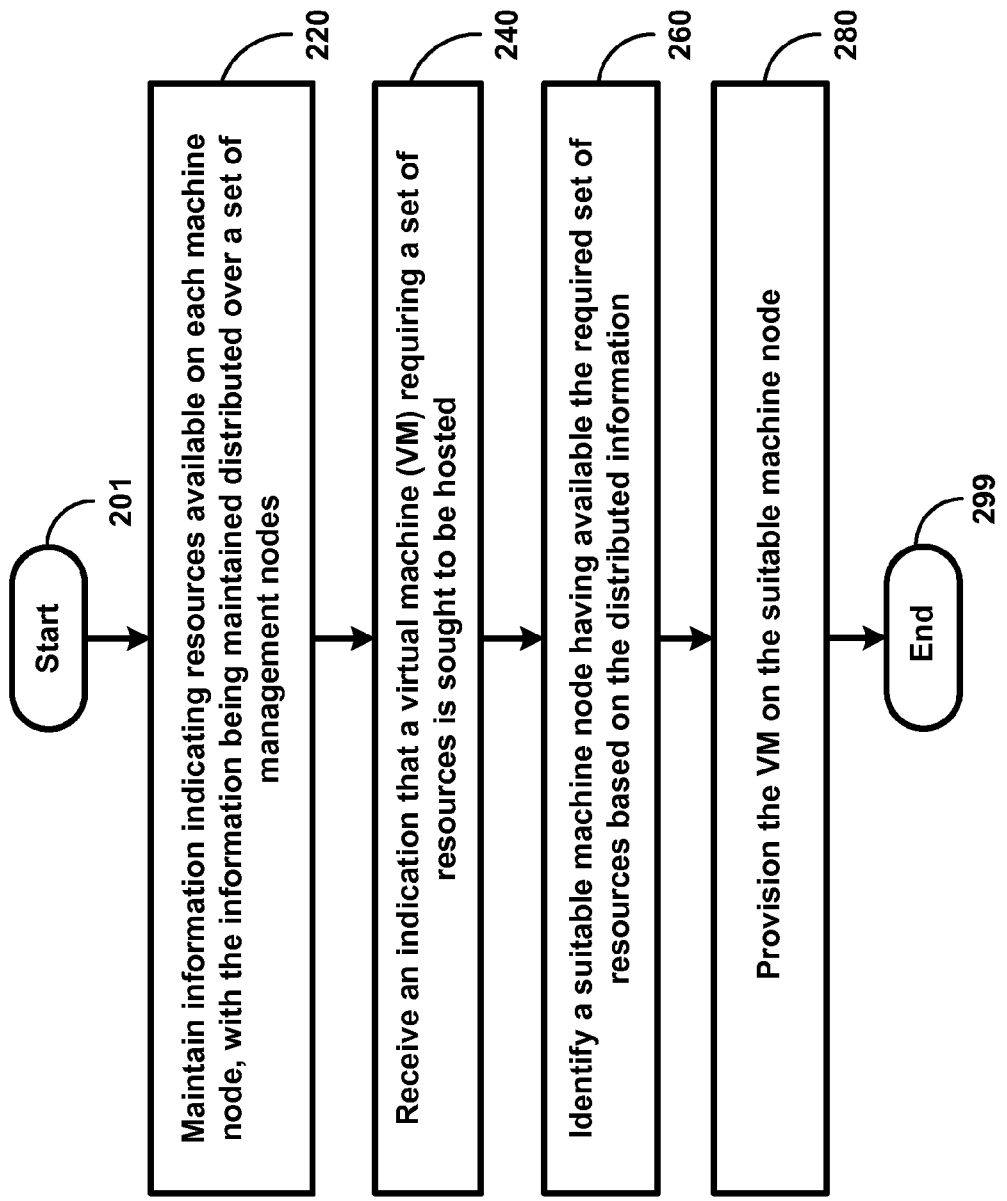
FIG. 2 is a flow chart illustrating the manner in which a suitable node to host a VM is selected in an environment containing a large number of nodes according to an aspect of the present invention.

FIG. 2 is a flow chart illustrating the manner in which a suitable node to host a VM is selected in an environment containing a large number of nodes according to an aspect of the present invention. The flowchart is described with respect to FIG. 1, and in relation to grid 130 merely for illustration. However, the features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 220.

In step 220, information indicating unused/free resources available on each machine node (one of server systems 140A-140Z) is maintained distributed over a set of management nodes in grid 130. Machine nodes refer to nodes which are used for hosting VMs. Thus, a machine node can be any of the server systems 140A-140Z. A management node refers to a node which maintains information on the resources available ("resource availability information") on the machine nodes. According to an aspect of the present invention, several of machines nodes are used as management nodes (for scalability), though dedicated nodes can also be used for maintaining respective portions of the information.

The resource availability information is maintained distributed over several management nodes, implying that different portions (at least some of it non-overlapping) of such information are stored in different management nodes. Due to such distribution of information, a desired piece of such information may be present on some/one of the management nodes, but not in others. Thus, distributed maintenance of resource availability information implies that the information stored on multiple management nodes may need to be considered for desired optimal match of required resources.

In step 240, an indication is received (by one of the management nodes) that a virtual machine (VM) requiring a set of resources is sought to be hosted. The indication may be received, for example, from scheduler 150, when a new VM is sought to be added or when a hosted VM is sought to be migrated (moved to another machine node).

In step 260, a suitable machine node satisfying (having available) the required set of resources is identified by examining the distributed information maintained in the set of management nodes. Any suitable approach may be used to examine the information stored on different management nodes and to identify a suitable node. An identification of the suitable node may be sent to scheduler 150 as a response to the indication received in step 240.

In step 280, the VM is hosted/provisioned on the identified suitable machine node. The hosting of the VM on the suitable node may be performed by scheduler 150 on receiving the response indicating the suitable node. Accordingly, scheduler 150 may be designed to provision a new VM on the suitable node. In case such provisioning is performed for migrating the VM, scheduler 150 may also terminate the migrating VM in another hosted node.

On successful hosting, the distributed information maintained by the set of management nodes may be updated to reflect the changes to the free resources available on the suitable machine node. Scheduler 150 may also send update information to load balancer 160. The flow chart ends in step 299.

Thus, by maintaining distributed information spread across multiple management nodes, the solution may scale for use in environments having a large number of nodes. The manner in which the information related to machine nodes may be maintained in a distributed manner is described below with examples.

4. Distributed Maintenance of Information

Figures 3A, 3B:
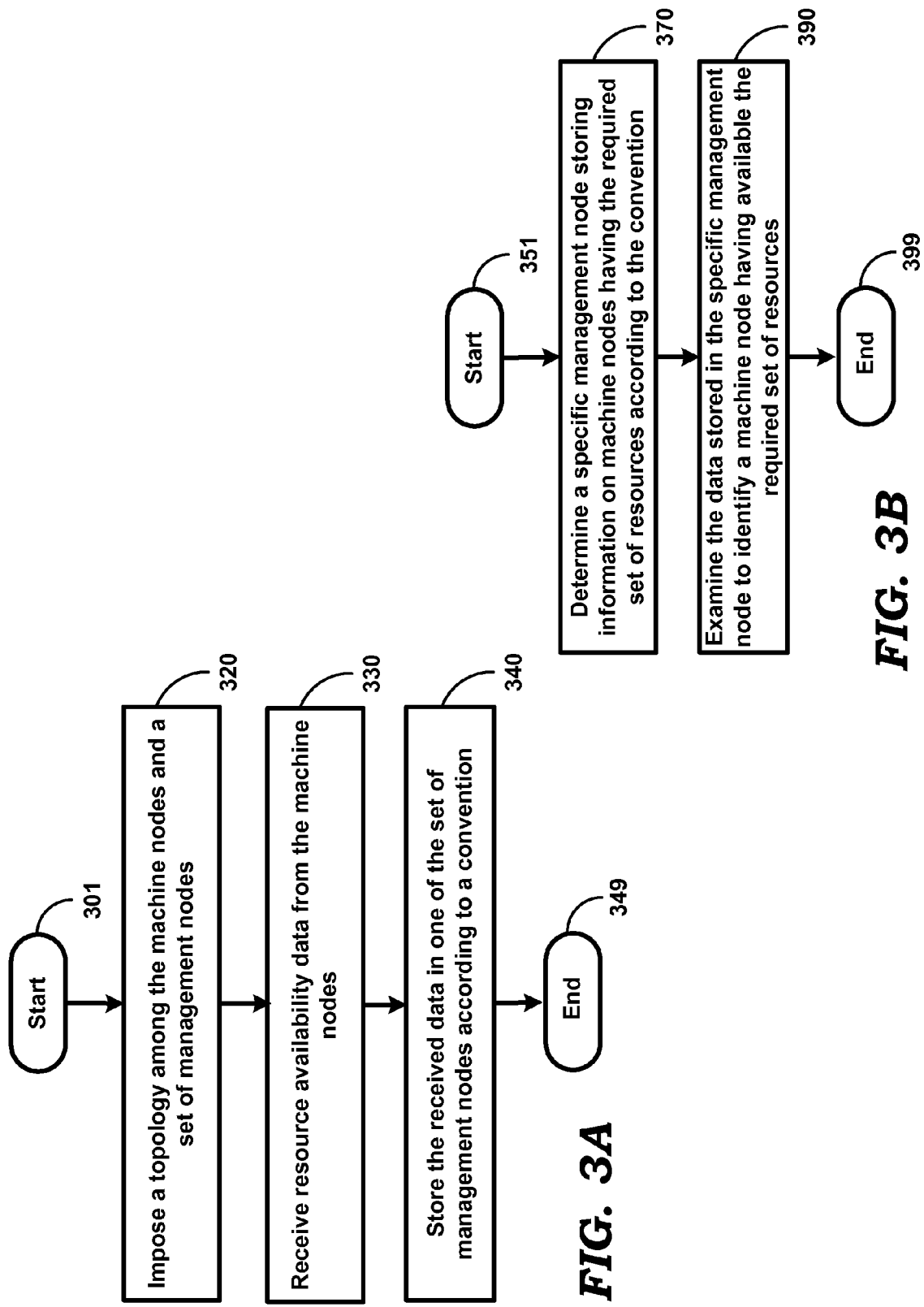
FIG. 3A is a flow chart illustrating the manner in which information (such as the available resources) related to machine nodes in a grid is maintained in a distributed manner according to an aspect of the present invention.
FIG. 3B is a flow chart illustrating the manner in which a machine node satisfying a required set of resources (i.e., suitable to host a VM) is identified based on the distributed information according to an aspect of the present invention.

FIG. 3A is a flow chart illustrating the manner in which information (such as the available resources) related to machine nodes in a grid (130) is maintained in a distributed manner according to an aspect of the present invention. The flowchart is described with respect to FIG. 1, and in relation to grid 130 merely for illustration. However, the features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 301, in which control immediately passes to step 320.

In step 320, a topology is imposed among the machine nodes and a set of management nodes in grid 130, with the goal of assigning respective management nodes that would receive information on resources available on each machine node. The imposed topology may be a logical network indicating the manner in which data is communicated among the machine/management nodes, with each link between two nodes representing an actual physical connection between the systems or a virtual connection (spanning one or more physical connections) between the nodes. Such a logical topology may take into account the accessibility issues related to the nodes (for example, some of the nodes may be behind a firewall and may be accessed only through a proxy node) in the grid.

Thus, the management nodes for a machine node, may be determined based on location (e.g. one per data center), connectivity (e.g. the number of nodes that are accessible from each management node), function (e.g. a scheduler), etc. It may be appreciated that the set of management nodes themselves may be viewed as forming another topology, for example, a peer to peer (P2P) network as described below.

In step 330, the resource availability data is received from the machine nodes. The topology of above determines the specific management nodes that receive the data from each machine node. The resource availability data specifies the set of resources available in the machine node. Any desired set of resources may be chosen based on the determination of the suitability of nodes for hosting VMs.

In one embodiment, resource availability data for a machine node specifies a maximum size of a VM that can be supported by the machine node and a load factor (also referred to as "alpha") indicating the additional load (e.g., measured as number of user requests) that can be sustained by the machine node under peak usage. The maximum size is further specified as a combination of a measure (typically specified in terms of virtual number of processors) of the processor time available in the machine node and an amount of memory available in the machine node. The processor time may be shared by multiple VMs hosted on a single machine node, while the memory space is dedicated to (not shared among) specific VMs.

The resource availability data may also specify other information such as the geographical location of the machine node, the security policies enforced in the machine node, the types of applications supported by the operating system/hardware in the machine node, etc. which may also be taken into consideration for selecting the suitable node. In an embodiment, the resource availability data is sent as a corresponding advertisement from each machine node to a corresponding management node.

In step 340, each of the received resource availability data is stored in one of the set of management nodes according to a convention. It should be appreciated that the management node on which information for a machine node is stored, is generally different from management node(s) receiving information in step 330.

The management node for storing the resource availability data for a machine node, may be selected using any suitable convention. In general, the convention maps each value of available resources (specified in the resource availability data) to a corresponding management node. The value of an available resource may be a single value (such as the amount of memory) or a range of values for the resource (such as load factor). Further, the mapped value of available resources may be for a single resource or for a combination of resources available in the machine node.

According to one convention referred to as dynamic hash tables (DHT), the values (single/range of one/multiple ones) of the available resources and the identifiers of the management nodes are mapped to the same set of hashed identifiers by using corresponding hash functions. The value of the available resources for a machine node (indicated by the resource availability data) is stored in a specific management node if the same hashed identifier is generated by both of the hash functions based respectively on the value and a node identifier of the specific management node. DHT is described in further detail in a document entitled "Looking up data in P2P systems" by Hari Balakrishnan, M. Frans Kaashoek, David Karger, Robert Morris, and Ion Stoica published in Communications of the ACM 46, 2 (February 2003), Pages 43-48.

It may be appreciated that in some scenarios, it may not be possible to find a management node having the hashed identifier equal to that generated for a value of the available resources for a machine node. Alternatively, the specific management node may not be available (powered off or not connected to the network).

Accordingly, the convention may further specify the manner in which a second management node to store the resource availability date of the machine node is to be determined. In one embodiment, the set of hashed identifiers are in a sequential order, and the second management node is determined as the node whose hashed identifier is a successor to the hashed identifier of the specific management node according to the sequential order. The resource availability data of the machine nodes is then stored in the second management node. The flow chart ends in step 349.

Thus, the resource availability information is maintained distributed among the set of management nodes. The manner in which a suitable node is identified based on such distributed information is described below with examples.

5. Identifying a Suitable Node

FIG. 3B is a flow chart illustrating the manner in which a machine node satisfying a required set of resources (i.e., suitable to host a VM) is identified based on the distributed information according to an aspect of the present invention. The flowchart is described with respect to FIG. 1, and in relation to grid 130 merely for illustration. However, the features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 351, in which control immediately passes to step 370.

In step 370, a specific management node storing information on machine nodes having the required set of resources is determined according to the convention (used in step 340). The determination is performed by first determining the hashed identifier corresponding to the value of one or more of the required set of resources (or a range covering thereof) by using the corresponding hash function.

The specific management node is then determined as the management node whose hashed identifier is equal to the determined hashed identifier. In a scenario that no such management node is available, the specific management node is determined based on where such a value may be alternatively stored based on the convention. In the embodiment described above, the specific management node is determined as the node whose hashed identifier is a successor of the determined hashed identifier according to the sequential order of the hashed identifiers.

In step 390, the data stored in the specific management node is examined to identify a machine node having available the required set of resources (that is the suitable node). The examination may be performed based on the values of the other resources not used in hashing function in the determination of step 370.

In an embodiment, each management node maintains the resource availability data for only a few number (typically in the range 10-100) of machine nodes, and accordingly the examination of the data maintained in the specific management node may be performed within a short duration of time, thereby ensuring that a faster response to the indication (for hosting a VM) in step 240. The flow chart ends in step 399.

Thus, the distributed information maintained according to a convention is examined to identify a suitable node for hosting a VM. The manner in which the steps of the flow charts shown in FIGS. 3A and 3B are implemented in one embodiment is described below with examples.

6. Example Implementation

FIGS. 4A, 4B, 5A-5C and 6 together illustrate the manner in which selection of suitable nodes for hosting virtual machines (VMs) in environments containing a large number of nodes (such as grid 130) is facilitated in one embodiment. Each of the Figures is described in detail below.

Figure 4B:
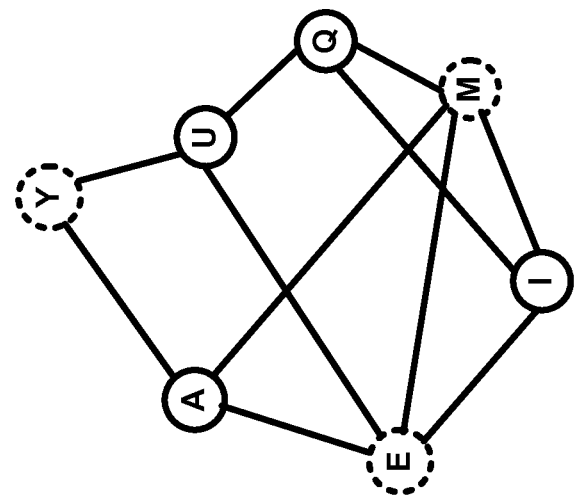
FIG. 4B depicts the manner in which the set of management nodes in a grid is structured in one embodiment.
Figure 4A:
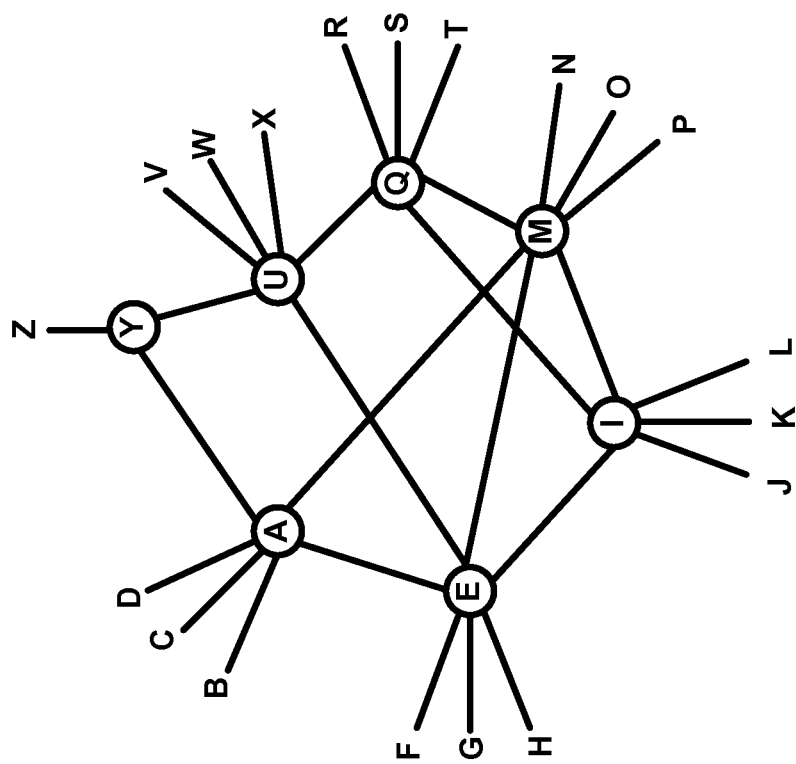
FIG. 4A depicts the manner in which a topology is imposed among the machine/management nodes in a grid in one embodiment.

FIG. 4A depicts the manner in which a topology is imposed among the machine/management nodes in grid 130 in one embodiment. The description is continued assuming that each of the server systems 140A-140Z (hereafter referred to as nodes A-Z) is a machine node capable of hosting VMs as well as acting as a management node storing resource availability information.

The topology imposed is based on the IP address of the machine nodes, such that for each collection of four nodes (as represented by the last two bits of the IP address), three of the four nodes are visualized as being linked to (and according is accessible from) the fourth node (a management node). Assuming for convenience that the machine nodes A-Z are represented by the IP address 192.168.1.1 through 192.168.1.26 respectively, the collection of four nodes A-D is logically represented as management node A (shown circled) connected to the machine nodes B-D as shown in FIG. 4A. In other words, node A operates as a management node for the group of nodes A-D.

Similarly, other collections of four nodes E-H, I-L, M-P, Q-T, U-X and Y-Z are represented respectively as the management nodes E, I, M, Q, U and Y (all shown circled) connected to the other nodes in the corresponding collection. The management nodes are also shown to be connected to each other by actual/virtual links.

Thus, a topology is imposed on the machine/management nodes in grid 130, and may span multiple physical networks (for example, the networks in data centers 130A and 130B). The management nodes determined by the topology, may further be organized as described below (for the purpose of distributing the resource availability data).

FIG. 4B depicts the manner in which the set of management nodes in grid 130 is structured in one embodiment. The set of management nodes A, E, I, M, Q, U, and Y is viewed as forming a structured peer to peer (P2P) network, wherein all of the management nodes are viewed as equal participants (in terms of processing/maintaining information) in the topology.

P2P networks are in contrast to a client-server model where server nodes are considered as higher participants in the network in relation to client nodes (in view of the server node performing more processing/storing more information than the client nodes). P2P networks enable any of the nodes to join/leave the network without affecting the working of the entire system, again in contrast to client-server model where server nodes cannot typically leave the network without affecting the working of the system.

Thus, in FIG. 4B, some of the management nodes (E, M and Y) are shown circled in dotted lines indicating that the nodes are not available (for storing the resource availability information) in the P2P network. It should be noted that though the management nodes are shown as not being available, they (and the corresponding machine nodes in the collection) may still be accessible in the physical network.

A structured P2P network employs a globally consistent protocol to ensure that any node can efficiently route a search to some peer node having the desired information. The protocol is enforced by software modules/agents executing in each of the nodes in the structured P2P network. Examples of protocols used for structured P2P networks include CHORD, CAN, Pastry, Tapestry, etc. P-Grid is an example structured P2P network that uses a combination of algorithms to provide distributed information management. The manner in which resource availability information is stored distributed in a structured P2P network is described below with examples.

7. Storing Information Distributed in a Structured P2P Network

Figures 5A, 5B:
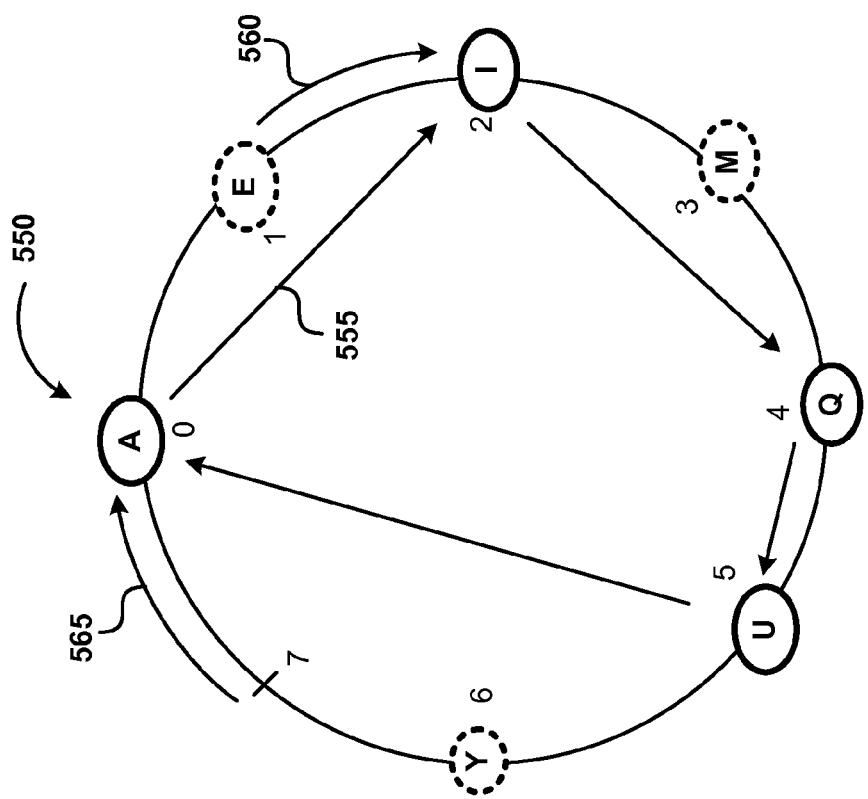
FIG. 5A depicts the manner in which dynamic hash tables (DHT) based on available load factor (alpha) is implemented in one embodiment.
FIG. 5B depicts the manner in which unavailable management nodes (and/or identifiers) are resolved according to CHORD protocol in one embodiment.
Figure 5C:
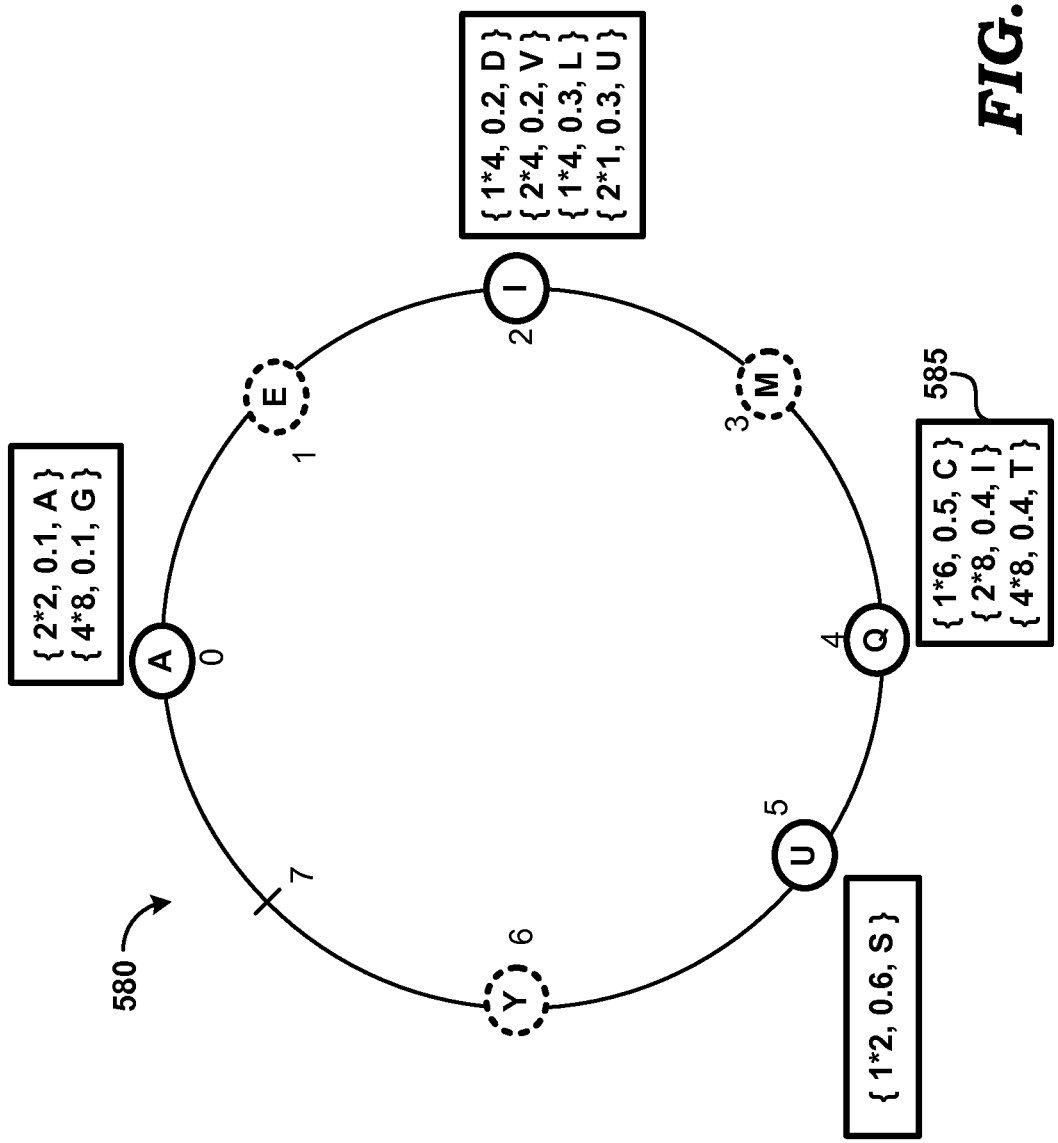
FIG. 5C depicts the manner in which resource availability information is maintained in a structured P2P network according to CHORD protocol in one embodiment.

FIGS. 5A, 5B and 5C together illustrate the manner in which resource availability information is maintained (in a distributed fashion) in a structured P2P network in one embodiment. The description is continued with respect to a structured P2P network maintained according to CHORD protocol described in further detail in a document entitled "Chord: a scalable peer-to-peer lookup protocol for internet applications" by Ion Stoica, Robert Morris, David Liben-Nowell, David R. Karger, M. Frans Kaashoek, Frank Dabek, and Hari Balakrishnan published in IEEE/ACM Transactions on Networking 11, 1 (February 2003), pages 17-32. However, several features of the present invention can be implemented using other types and/or protocols of structured P2P networks as will be apparent to one skilled in the relevant arts by reading the disclosure provided herein.

According to the CHORD protocol, the values of the available resources and the node identifiers (where the corresponding information is to be stored) are mapped using dynamic hash tables (DHT). As noted above, DHT are implemented by having two hash functions, a first hash function that generates a corresponding one of a set of hashed identifiers for each value of the available resources (load factor, in this embodiment) and a second hash function which generates a corresponding one of the same set of hashed identifiers for the unique node identifier of a corresponding one of the set of management nodes.

FIG. 5A depicts the manner in which dynamic hash tables based on available load factor (alpha) is implemented in one embodiment. Table 500 depicts the mappings from the values of the available resources (load factor) and the node identifiers (of the management nodes) to the common set of hashed identifiers. In the present embodiment, a 3-bit CHORD protocol is chosen for the DHT and accordingly the common set of hashed identifiers is determined to be from 0 (binary 000) to 7 (binary 111) as indicated by column 520.

The first hash function maps ranges of the available load factor (alpha) shown in column 510 to the hashed identifiers in the corresponding row. For convenience, it is assumed that the load factor is specified as a real number between 0 (indicating no load available) to 1 (full load available on the machine node). The first hash function (H1) is depicted below:

$$H1 = \text{floor}((alpha - 0.01) * 10)$$

wherein, alpha is the load factor, "−" and "*" are the subtraction and multiplication operators and "floor" is a function that rounds the specified real number (as the parameter) down, and returns the largest number that is less than or equal to the specified real number.

Thus, for load factor 0.4, the first hash function H1=floor((0.4-0.01)*10)=floor(0.39*10)=floor(3.9)=3, the corresponding hashed identifier. Similarly, other values of the load factor (alpha) are mapped to the same set of hashed identifiers (0-7) as shown by corresponding rows in table 500.

The second hash function maps the unique node identifiers of the management nodes (shown in column 530) to the same set of hashed identifiers. For simplicity, the last octet of the IP addresses of a node is chosen as the corresponding node identifier. The second hash function (H2) is depicted below:

$$H2 = \text{nodeid div } 4$$

wherein, "div" is a binary function that takes two parameters A and B and returns the quotient of dividing A by B. As such, "div 4" implies that the quotient of nodeid divided by 4 is returned.

Thus, for management node M (whose IP address is 192.168.1.13 and accordingly the node identifier is the last octet "13"), the second hash function H2=(13 div 4)=3, the corresponding hashed identifier. Similarly, other management nodes are mapped to the same set of hashed identifiers (0-7) as shown by corresponding rows in table 500.

According to DHT, the values (single/range of one/multiple ones) of the available resources and the identifiers of the management nodes are mapped to the same set of hashed identifiers. Thus, a resource availability data from a machine which specifies an available load factor of 0.4 is stored in the management node M, since the value of the resource 0.4 and the management node M are mapped to the same hashed identifier "3" (as shown above) by the corresponding hash functions.

As noted above, there may be scenarios where no management node maps the hashed identifier corresponding to the value of the resources or mapped management node may not be available in the overlay. The manner in which such scenarios are resolved is described below with examples.

FIG. 5B depicts the manner in which unavailable management nodes (and/or identifiers) are resolved according to CHORD protocol in one embodiment. It may be observed that nodes E, M and Y (corresponding to the hashed identifiers 1, 3 and 6) are unavailable as indicated by the dotted circles. Further, the hashed identifier 7 is not available since there is no node that is mapped to the same identifier.

According to the CHORD protocol, the management nodes mapping to the set of hashed identifiers (0-7, as shown in the Figure) may be viewed as forming a ring 550. Each node in ring 550 is aware of its successor available node in the clockwise direction around the ring (as indicated by the arrow 555 inside the ring). The successor of a node is defined as the first available node in the ring whose hashed identifier is greater than the hashed identifier of the node in a cyclic manner (wherein 0 comes after 7).

Thus, as shown in FIG. 5B, the successor of E (an unavailable node) is identified as I (as indicated by arrow 560), while the successor of the key value 7 (an unavailable identifier) is identified as A (as indicated by arrow 565). It should be noted that the successor of Y is also A (since A is the first available node succeeding the hashed identifier 6).

Accordingly, the resource availability data of machine nodes whose load factor maps to unavailable nodes/identifiers are stored in the succeeding management nodes according to the CHORD protocol. The manner in which the resource availability information is maintained according to CHORD protocol is described below with examples.

FIG. 5C depicts the manner in which resource availability information is maintained in a structured P2P network according to CHORD protocol in one embodiment. As noted above, the resource availability data is sent as a corresponding advertisement from each machine node to a corresponding management node (in the collection), with the corresponding management node then determining the specific one of the set of management nodes on which the advertisement is to be stored according to the convention (CHORD protocol). For example, advertisements from B-D is sent to the corresponding management node A, which then determines the specific management node on which the advertisements are to be stored (based on the hashed identifiers generated for the resource values in the advertisements).

In one embodiment, the advertisements are according to Resource Data Format (RDF), which is described in a book entitled "Practical RDF" by Shelly Powers published July 2003 by O'Reilly & Associates, Inc. and having ISBN 10: 0-596-00263-7 and ISBN 13: 9780596002633. In brief, RDF provides a general method for conceptual description or modeling of information (specified using a variety of syntax formats such as XML) implemented in web resources. Each RDF advertisement may be viewed as a triple containing a subject denoting the resource (such as the VM size available, which in turn is a combination of the processor time and the memory available), a predicate denoting traits or aspects of the resource and expressing a relationship between the subject and the object (such as the available load factor) and the object (the machine node where the resource is available). For convenience, in the disclosure herein, a RDF triple is shown as the triple {subject, predicate, object}.

Thus, the machine node C having available a processor time equivalent to 1 virtual processor (of a pre-specified number of virtual processors defined on the installed set of physical processors), 6 gigabytes (Gb) of RAM and able to support a load factor of 0.5 may send an advertisement as the RDF triple {1*6, 0.5, C} to management node A (of the same collection). It is noted that the "*" in the VM maximum size (the subject) is merely a denotation and does not imply a multiplication operation. Similarly, the machine node T may send an advertisement (to its corresponding management node Q) such as {4*8, 0.4, T} indicating that a processor time equivalent to 4 virtual processors, 8 Gb of RAM and a load factor of 0.4 is available on the machine node T.

Referring back to FIG. 5C, ring 580 depicts the manner in which advertisements sent by 10 machine nodes are maintained (distributed) according to CHORD protocol. The advertisements stored in each management node are shown in the corresponding box associated with the node. For example, box 585 depicts the advertisements {1*6, 0.5, C}, {2*8, 0.4, I}, and {4*8, 0.4, T} stored in management node Q. It may be observed that advertisements (for example, {1*6, 0.5, C}) are stored on the management nodes matching the hashed identifiers (values 3 and 4) generated by the first hash function and not on the corresponding management nodes (such as A for the machine node C).

On receiving an advertisement such as {1*6, 0.5, C}, the corresponding management node A first determines the hashed identifier (4 based on function H1). If the hashed identifier is greater than a hash identifier of itself (here 0 for A, as shown), the advertisement is forwarded either to an immediate successor node (here I from A), or to another successor node further closer to the destination node using the finger table described below. Briefly, the finger table is used to identify closer nodes based on the hashed identifier and the advertisement may be forwarded directly to the identified closer node (thereby bypassing several intermediate nodes in the ring).

The immediate successor is determined taking into account the availability of specific management nodes in the ring. For example, on receiving the advertisement {1*4, 0.2, D}, management node A determines that node E (corresponding to the hashed identifier 1) is not available and accordingly forwards the advertisement to node I (the successor of node E) for storage.

It may be observed that the advertisements are distributed fairly in a uniform manner (in terms of the number of advertisements stored in each management node). It is generally desirable that such uniform distribution of the advertisements be maintained even when the number of advertisements increases to a large number (as may be required in an environment containing a large number of nodes). As indicated by their names, dynamic hash tables provide for dynamic (during processing of the advertisements based on the availability of management nodes) modification of the hashing functions to ensure that such uniform distribution is achieved. In general, any pair of order preserving hash functions may be chosen as the basis of the DHT, as long as the chosen pair generates the same set of hashed identifiers.

Thus, various advertisements of the resource availability data received from different machine nodes are maintained distributed among the set of (available) management nodes. The distributed information may be used for identifying suitable nodes for hosting VMs as described in detail below.

An indication that a VM requiring a set of resources (for example, time equivalent to 2 virtual processors, 4 Gb of RAM and load factor of 0.3) is sought to be hosted may be received by one of the management nodes (assumed to be A for illustration). The indication may be received in the form of an RDF requirement triple such as {>=2*4, >=0.3, ?}, where the ">=" (greater than) symbol indicates that the required set of resources are to be matched or exceeded and the "?" in the object field indicates that the matching nodes are to be found. Such an indication may be specified using a RDF query language such as SPARQL (which stands for SPARQL Protocol and RDF Query Language).

Management node A first determines the hashed identifier for the requirement triple using the hashed function H1. Accordingly, the hashed identifier 3 is determined corresponding to the load factor 0.31 (more than 0.3). Node A then checks whether the required hashed identifier is greater than its hashed identifier (0), in which case node A forwards the requirement triple to its successor node. Each management node (for example, I) in the ring receiving the requirement triple, compare the corresponding required hashed identifier with its hashed identifier and forwards (if greater than its hashed identifier, here 2) the requirement triple to its successor until a management node (such as Q) whose hashed identifier (4) is greater than the required hashed identifier (3) is reached.

Thus, the management node Q is determined as the specific management node storing information on machine node having the required set of resources (at least in terms of the load factor). The advertisements stored in the determine management node Q is then examined (to match the other requirements specified in the triple such as the combination of processor time and memory, 2*4) to identify the machine node T (based on the matching advertisement {4*8, 0.4, T} stored in Q) as having the available set of resources specified in the indication. The new/migrated VM may then be provisioned on the identified machine node T.

It may be appreciated that the provisioning of the new VM on machine node T may cause reduction in the availability of resources in machine node T. For example, the maximum VM size that can be supported by machine node T may be reduced to 2*4 (computed based on the equation current VM size−provisioned VM size=4*8−2*4). Similarly, the load factor of the machine node T may be reduced to 0.1 (current load factor−provisioned load factor=0.4−0.1). The reduced set of resources available may be sent as a new advertisement (or an update of the old advertisement) in the form {2*4, 0.1, T}, which may then be stored in a corresponding management node A according to the convention (since the hashed identifier for the new advertisement is 0 based on table 500). The older advertisement stored in management node Q may then be removed. Similarly, the resource availability data for each of the machine nodes may be updated/stored in the set of management nodes.

It may be observed that each management node may maintain only the information (such as the IP address) required for accessing its successor node. However, in scenarios where the size of the ring is appreciably large, it may be necessary that each management node may maintain information to directly forward to any of a list of successors (commonly referred to as finger table in CHORD protocol), for example, in increasing hops of powers of 2, that is, the immediate successor, a first level successor at a distance of 2 from the management node, a second level successor at a distance of 4 from the management node, etc. The search for a required set of resource may be appropriately modified to take into consideration the information maintained in the management node (for example, based on the finger table, forward the requirement triple to the management node whose hashed identifier is closest to the required hashed identifier).

Furthermore, though only one node is shown as being identified as the suitable node, it may be appreciated in environments containing a large number of nodes, multiple suitable nodes for the same required set of resources may be identified. The determination of the specific one of the suitable nodes on which the VM is to be provisioned may be performed based on other factors, such as the geographical location of the suitable nodes, the proximity of the suitable node to the other nodes already hosting VMs, etc.

It may be further appreciated that a structured P2P network such as the one described above facilitates storage of advertisements based on (single or range of) values of a single resources (such as available load factor) or a combination of values of multiple resources. However, it may be beneficial to group the nodes based on the resource types or multiple ranges of the values of the same resource, in particular when searching for suitable nodes in environments containing a large number of nodes.

According to an aspect of the present invention, a semantic network is further overlaid on the structured P2P network to facilitate grouping of nodes as described below with examples.

8. Using a Semantic Overlay Network

A semantic network may be overlaid on the network topology of FIG. 4A based on the different types of resources. A semantic network, similar to the P2P network, is enforced by software modules/agents executing in each of the nodes. A semantic network may support queries at a higher level (for example, based on multiple resources) as compared to a P2P network. An example semantic network overlaid on a P2P network is GridVine, which is described in detail in a document entitled "GridVine: An Infrastructure for Peer Information Management," by Philippe Cudre-Mauroux, Suchit Agarwal, and Karl Aberer, published in IEEE Internet Computing, vol. 11, no. 5 (September/October 2007), pages 36-44.

For example, the same advertisement received from a machine node may be stored in same/multiple nodes based on the different mappings of two different resources (for example, load factor and the memory available). The two different mappings may be viewed as grouping the nodes into different groups. A search for a required set of resources may then be conducted independently possibly in parallel, based on the two different mappings in two different groups and using the results determined first, thereby speeding up the identification of the suitable nodes.

A semantic network may also be used for grouping the nodes (in grid 130) based on the different ranges of values of the same resource. For example, in the above described embodiment, the nodes in grid 130 may be grouped based on the available load factor advertised by the machine nodes into a high availability group G1 (with alpha>=0.3) and a low availability group G2 (with alpha<0.3). Thus, the nodes L, U, C, I, T and S are deemed to be part of group G1 (whose information is maintained in the management nodes I, Q and U), while the nodes A, G, D and V are deemed to be part of G2 (and whose information is maintained in management nodes A and I).

Such grouping may help in identifying subsets of the nodes matching the search criteria and accordingly speed up the identification of the suitable nodes. The grouping of nodes for the same resource may be performed in addition or along with the grouping based on the different resources described above.

When a search is performed, based on the requirement of a load factor>=0.3, the group G1 may be identified and the search may be initiated from the management node I having the smallest hashed identifier in the group. It may be observed that by providing the grouping using a semantic network, the search starts from the management node I as compared to management node A for a P2P network as described above (thereby reducing the time taken to determine the specific management node Q and accordingly the identification of the suitable node T).

It should be appreciated that the features described above can be implemented in various embodiments as a desired combination of one or more of hardware, software, and firmware. The description is continued with respect to an embodiment in which various features are operative when the software instructions described above are executed.

9. Digital Processing System

Figure 6:
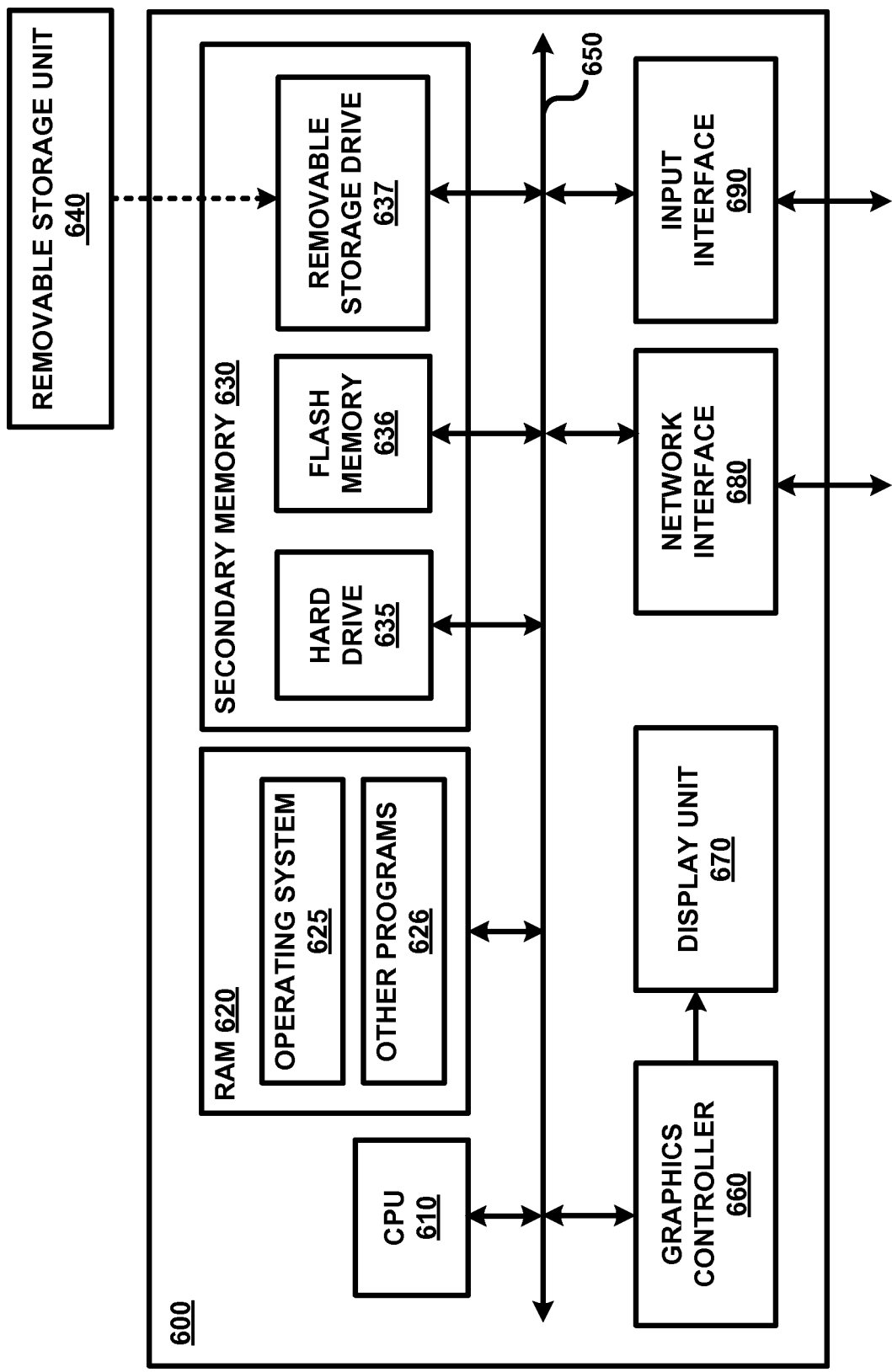
FIG. 6 is a block diagram illustrating the details of a digital processing system in which various aspects of the present invention are operative by execution of appropriate software instructions.

FIG. 6 is a block diagram illustrating the details of digital processing system 600 in which various aspects of the present invention are operative by execution of appropriate software instructions. Digital processing system 600 may correspond to one of the machine or management nodes (such as server systems 140A-140Z) of grid 130.

Digital processing system 600 may contain one or more processors such as a central processing unit (CPU) 610, random access memory (RAM) 620, secondary memory 630, graphics controller 660, display unit 670, network interface 680, and input interface 690. All the components except display unit 670 may communicate with each other over communication path 650, which may contain several buses as is well known in the relevant arts. The components of FIG. 6 are described below in further detail.

CPU 610 may execute instructions stored in RAM 620 to provide several features of the present invention. CPU 610 may contain multiple processing units, with each processing unit potentially being designed for a specific task. Alternatively, CPU 610 may contain only a single general-purpose processing unit.

RAM 620 may receive instructions from secondary memory 630 using communication path 650. RAM 620 is shown currently containing software instructions constituting operating system 625 and/or other code/programs 626 (such as client applications, Web browser, application instances processing user requests, load balancer/management applications, RDBMS, etc.). In addition to operating system 625, RAM 620 may contain other software programs such as device drivers, virtual machines, etc., which provide a (common) run time environment for execution of other code/programs.

Graphics controller 660 generates display signals (e.g., in RGB format) to display unit 670 based on data/instructions received from CPU 610. Display unit 670 contains a display screen to display the images defined by the display signals. Input interface 690 may correspond to a keyboard and a pointing device (e.g., touch-pad, mouse) and may be used to provide inputs. Network interface 680 provides connectivity to a network (e.g., using Internet Protocol), and may be used to communicate with other systems connected to communication path 135.

Secondary memory 630 may contain hard drive 635, flash memory 636, and removable storage drive 637. Secondary memory 630 may store the data (for example, the advertisements received from machine nodes, in case of a management node) and software instructions (for example, facilitating enforcement of the CHORD protocol), which enable digital processing system 600 to provide several features in accordance with the present invention.

Some or all of the data and instructions may be provided on removable storage unit 640, and the data and instructions may be read and provided by removable storage drive 637 to CPU 610. Floppy drive, magnetic tape drive, CD-ROM drive, DVD Drive, Flash memory, removable memory chip (PCMCIA Card, EPROM) are examples of such removable storage drive 638.

Removable storage unit 640 may be implemented using medium and storage format compatible with removable storage drive 638 such that removable storage drive 637 can read the data and instructions. Thus, removable storage unit 640 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 640 or hard disk installed in hard drive 635. These computer program products are means for providing software to digital processing system 600. CPU 610 may retrieve the software instructions, and execute the instructions to provide various features of the present invention described above.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

10. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of selecting suitable nodes to host virtual machines (VMs) in a grid containing a plurality of machine nodes capable of hosting VMs, said method comprising:
    maintaining information indicating corresponding resources available for hosting VMs in each of said plurality of machine nodes,
    wherein said information comprises resource availability data for each of said plurality of machine nodes and is maintained on a plurality of management nodes of said grid, said resource availability data for each machine node indicating the resources available in the machine node for hosting VMs,
    wherein a specific management node of said plurality of management nodes for maintaining the resource availability data of a machine node is selected according to a convention which maps the resource availability data of the machine node to the specific management node whereby a respective portion of said information maintained by each management node comprises resource availability data for corresponding multiple machine nodes external to the management node;
    receiving an indication that a first VM requiring a first set of resources is sought to be hosted on a suitable one of said plurality of machine nodes;
    mapping, according to said convention, said first set of resources to a first management node of said plurality of management nodes;
    identifying, by said first management node, a first machine node having available said first set of resources, wherein said first machine node is contained in said plurality of machine nodes, wherein said identifying comprises examining the corresponding portion of said information maintained in said first management node to identify said first machine node; and
    provisioning said first VM on said first machine node as said suitable one of said plurality of machine nodes, after said identifying.

2. The method of claim 1, wherein said convention comprises a mathematical function that maps one or more values of resource availability data to corresponding identifiers of said plurality of management nodes,
    wherein each management node of said plurality of management nodes maintains the resource availability data of machine nodes that is mapped to the identifier of the management node.

3. The method of claim 2, wherein said mathematical function comprises: a first hash which generates a corresponding one of a set of hashed identifiers for each value of the available resources specified in said resource availability data; and a second hash which generates a corresponding one of said set of hashed identifiers for each node identifier, wherein each node identifier uniquely identifies a corresponding one of said plurality of management nodes, wherein a first value of available resources specified in the resource availability data of a machine node is mapped to said first management node, if the same hashed identifier is generated by both of said first hash and said second hash based respectively on said first value and a node identifier of said first management node.

4. The method of claim 3,
    wherein said indication is first received by said first management node of said plurality of management nodes,
    wherein said identifying comprises:
        checking in said first management node, by examining the respective portion maintained by said first management node, whether any one of the corresponding machine nodes has available all of said first set of resources;
        if said portion maintained on said first management node indicates a machine node having available all of said first set of resources, providing the machine node as said first machine node;
        if said portion maintained on said first management node indicates that there is no machine node having available all of said first set of resources,
            forwarding said indication to a second management node; and
            examining, in said second management node, the respective portion stored in said second management node to identify said first machine node as having available said first set of resources,
        wherein said second management node is contained in said plurality of management nodes.

5. The method of claim 4, wherein said set of hashed identifiers are in a sequential order, wherein said convention further comprises:
    if said first management node is unavailable, determining as said second management node a management node contained in said plurality of management nodes whose hashed identifier is a successor to the hashed identifier of said first management node according to said sequential order,
    wherein said maintaining maintains said first value in said second management node if said first management node is unavailable, and
    wherein said examining examines said second management node if said first management node is unavailable.

6. The method of claim 4, wherein said resource availability data for a machine node comprises a maximum size of a VM that can be supported by the machine node and a load factor indicating the load that can be sustained by the machine node under peak usage.

7. The method of claim 6, wherein said maximum size is specified as a combination of a measure of the processor time available in the machine node and an amount of memory available in the machine node.

8. The method of claim 7, wherein a value of available resource comprises a range of load factors and combinations of the measure of the processor time and the amount of memory.

9. The method of claim 8, wherein the value of available resource further comprises a geographical location of the machine node.

10. The method of claim 7, further comprising:
sending the resource availability data as a corresponding advertisement from each machine node to a corresponding management node,
wherein the corresponding management node determines the specific management node of said plurality of management nodes according to said convention, and causes said corresponding advertisement to be stored in the specific management node.

11. The method of claim 10, wherein the advertisement is in the form of a Resource Data Format (RDF) triple containing a subject, a predicate and an object,
wherein said maximum size is specified as the subject of said RDF triple, the load factor is specified as the predicate of said RDF triple and an identifier of said machine node is specified as the object of said RDF triple.

12. A computing system comprising:
a plurality of machine nodes capable of hosting virtual machines (VMs);
a plurality of management nodes operable to:
maintain information indicating corresponding resources available for hosting VMs in each of said plurality of machine nodes,
wherein said information comprises resource availability data for each of said plurality of machine nodes, said resource availability data for each machine node indicating the resources available in the machine node for hosting VMs,
wherein a specific management node for maintaining the resource availability data of a machine node is selected according to a convention which maps the resource availability data of the machine node to the specific management node whereby a respective portion for each management node comprises resource availability data for corresponding multiple machine nodes external to the management node;
receive an indication that a first VM requiring a first set of resources is sought to be hosted on a suitable one of said plurality of machine nodes;
map, according to said convention, said first set of resources to a first management node of said plurality of management nodes; and
identify, by said first management node, a first machine node having available said first set of resources, wherein said first machine node is contained in said set of machine nodes, wherein said identify comprises examining the corresponding portion of said information maintained in said first management node to identify said first machine node; and
a scheduler system to send said indication and to provision said first VM on said first machine node as said suitable one of said plurality of machine nodes, after said identify operation.

13. The computing system of claim 12, wherein said convention comprises a mathematical function that maps one or more values of resource availability data to corresponding identifiers of said plurality of management nodes,
wherein each management node of said plurality of management nodes maintains the resource availability data of machine nodes that is mapped to the identifier of the management node.

14. The computing system of claim 13, wherein said mathematical function comprises:
a first hash which generates a corresponding one of a set of hashed identifiers for each value of the available resources specified in said resource availability data; and
a second hash which generates a corresponding one of said set of hashed identifiers for each node identifier, wherein each node identifier uniquely identifies a corresponding one of said set of management nodes,
wherein a first value of available resources specified in the resource availability data of a machine node is mapped to said first management node, if the same hashed identifier is generated by both of said first hash and said second hash based respective on said first value and a node identifier of said first management node.

15. The computing system of claim 14,
wherein said indication is first received by said first management node of said set of management nodes,
wherein to perform said identify operation, said set plurality of management nodes are further operable to:
check in said first management node, by examining the respective portion maintained by said first management node, whether any one of the corresponding machine nodes has available all of said first set of resources;
if said portion maintained on said first management node indicates a machine node having available all of said first set of resources, provide the machine node as said first machine node;
if said portion maintained on said first management node indicates that there is no machine node having available all of said first set of resources,
forward said indication to a second management node; and
examine, in said second management node, the respective portion stored in said second management node to identify said first machine node as having available said first set of resources,
wherein said second management node is contained in said plurality of management nodes.

16. The computing system of claim 15, wherein said set of hashed identifiers are in a sequential order, wherein said convention further comprises:
if said first management node is unavailable, determining as said second management node a management node contained in said plurality of management nodes whose hashed identifier is a successor to the hashed identifier of said first management node according to said sequential order,
wherein said first value is maintained in said second management node if said first management node is unavailable, and
wherein said plurality of management nodes are operable to further examine said second management node if said first management node is unavailable.

17. The computing system of claim 15, wherein said resource availability data for a machine node comprises a maximum size of a VM that can be supported by the machine node and a load factor indicating the load that can be sustained by the machine node under peak usage,
wherein said maximum size is specified as a combination of a measure of the processor time available in the machine node and an amount of memory available in the machine node.

18. The computing system of claim 17, wherein the resource availability data is sent as a corresponding advertisement from each machine node to a corresponding management node,
wherein the corresponding management node determines the specific one of said set plurality of management nodes according to said convention, and causes said corresponding advertisement to be stored in the specific management node.

19. The computing system of claim 18, wherein the advertisement is in the form of a Resource Data Format (RDF) triple containing a subject, a predicate and an object,
wherein said maximum size is specified as the subject of said RDF triple, the load factor is specified as the predicate of said RDF triple and an identifier of said machine node is specified as the object of said RDF triple.

20. A non-transitory machine readable medium storing one or more sequences of instructions for causing a management node to facilitate selection of suitable nodes to host virtual machines (VMs) in a grid containing a plurality, of machine nodes capable of hosting VMs, wherein execution of said one or more sequences of instructions by one or more processors contained in said management node causes said management node to perform the actions of:
maintaining only a portion of total information indicating corresponding resources available for hosting VMs in each of said plurality of machine nodes,
wherein said total information comprises resource availability data for each of said plurality of machine nodes and is maintained on a plurality of management nodes of said grid, said plurality of management nodes including said management node, said resource availability data for each machine node indicating the resources available in the machine node for hosting VMs,
wherein a specific management node of said plurality of management nodes for maintaining the resource availability data of a machine node is selected according to a convention which maps the resource availability data of the machine node to the specific management node whereby a respective portion of said information maintained by each management node comprises resource availability data for corresponding multiple machine nodes external to the management node;
receiving a request to indicate a first machine node having available a first set of resources,
wherein said request is received in response to mapping, according to said convention, said first set of resources to said management node;
examining said portion to determine whether any one of the corresponding machines nodes has available all of said first set of resources;
if said examining determines a machine node as having available all of said first set of resources, sending a response indicating that said machine node is said first machine node having available said first set of resources;
if said examining determines no machine node as having available all of said first set of resources, forwarding said request to another management node of said plurality of management nodes.

21. The non-transitory machine readable medium of claim 20, wherein said convention comprises a mathematical function that maps one or more values of resource availability data to corresponding identifiers of said plurality of management nodes,
wherein each management node of said plurality of management nodes maintains the resource availability data of machine nodes that is mapped to the identifier of the management node.

22. The non-transitory machine readable medium of claim 21, wherein said mathematical function comprises:
a first hash which generates a corresponding one of a set of hashed identifiers for each value of the available resources specified in said resource availability data; and
a second hash which generates a corresponding one of said set of hashed identifiers for each node identifier, wherein each node identifier uniquely identifies a corresponding one of said plurality of management nodes,
wherein said portion comprises resource availability data for machine nodes having a first value of available resources, wherein the same hashed identifier is generated by both of said first hash and said second hash based respective on said first value and a node identifier of said management node,
wherein said another portion comprises resource availability data for machine nodes having a second value of available resources, wherein the same hashed identifier is generated by both of said first hash and said second hash based respective on said second value and a node identifier of said another management node.

23. The non-transitory machine readable medium of claim 22, wherein said set of hashed identifiers are in a sequential order, wherein said forwarding forwards said request to said another management node whose hashed identifier is a successor to the hashed identifier of said management node according to said sequential order.

24. The non-transitory machine readable medium of claim 23, wherein said resource availability data for a machine node comprises a maximum size of a VM that can be supported by the machine node and a load factor indicating the load that can be sustained by the machine node under peak usage, wherein said maximum size is specified as a combination of a measure of the processor time available in the machine node and an amount of memory available in the machine node.

25. The non-transitory machine readable medium of claim 24, wherein the resource availability data is received as a corresponding advertisement from each machine node in the form of a Resource Data Format (RDF) triple containing a subject, a predicate and an object,
wherein said maximum size is specified as the subject of said RDF triple, the load factor is specified as the predicate of said RDF triple and an identifier of said machine node is specified as the object of said RDF triple.

26. A method of selecting suitable nodes to host virtual machines (VMs) in a grid, said grid containing a plurality of machine nodes capable of hosting VMs, said method comprising:
receiving a plurality of advertisements, each advertisement being received from a machine node of said plurality of machine nodes, each advertisement containing resource availability data indicating the resources available in the machine node for hosting VMs;
for each resource availability data in said plurality of advertisements, selecting a corresponding management node according to a convention which maps one or more values constituting the resource availability data to one of a plurality of management nodes in said grid;
storing each of said plurality of advertisements in a corresponding selected management node such that the resource availability information of said plurality of machine nodes is maintained distributed in said plurality of management nodes;
receiving an indication that a first VM requiring a first set of resources is sought to be hosted on a suitable one of said plurality of machine nodes;
determining, according to said convention based on said first set of resources, a first management node of said plurality of management nodes as maintaining resource availability data of potential suitable machine nodes for hosting said first VM;

examining the corresponding portion of said resource availability information maintained in said first management node to identify a first machine node of said plurality of machine nodes as having available said first set of resources; and provisioning said first VM on said first machine node as said suitable one of said plurality of machine nodes, after said determining and said examining.

27. The method of claim 26, wherein said convention comprises a mathematical function that maps one or more values of resource availability data to corresponding identifiers of said plurality of management nodes, wherein each management node of said plurality of management nodes maintains the resource availability data of machine nodes that is mapped to the identifier of the management node.

* * * * *

UNITED STATES PATENT AND TRADEMARK OFFICE
CERTIFICATE OF CORRECTION

PATENT NO. : 8,713,182 B2
APPLICATION NO. : 12/534157
DATED : April 29, 2014
INVENTOR(S) : Agneeswaran It is certified that error appears in the above-identified patent and that said Letters Patent is hereby corrected as shown below:

On title page 2, column 2, Item [56] under Other Publications, line 12, delete ""Semnatic" insert -- "Semantic --, therefor.

In the Claims

Column 20, line 14, Claim 15, delete "said set" and insert -- said --, therefor.

Column 20, line 67, Claim 18, delete "said set" and insert -- said --, therefor.

Column 21, line 14, Claim 20, delete "plurality," and insert -- plurality --, therefor.

Signed and Sealed this
Seventh Day of October, 2014

Michelle K. Lee
*Deputy Director of the United States Patent and Trademark Office*